United States Patent [19]

Taguchi

[11] Patent Number: 5,231,517
[45] Date of Patent: Jul. 27, 1993

[54] IMAGE SIGNAL PROCESSING APPARATUS FOR DETECTING THE VALID PICTURE PORTIONS OF AN IMAGE SIGNAL

[75] Inventor: Tomishige Taguchi, Urawa, Japan

[73] Assignee: Canon Kabushiki Kaisha, Tokyo, Japan

[21] Appl. No.: 436,052

[22] Filed: Apr. 27, 1989

[30] Foreign Application Priority Data

Apr. 27, 1988 [JP] Japan .................................. 63-106468
Jun. 27, 1988 [JP] Japan .................................. 63-156703

[51] Int. Cl.⁵ .............................................. H04N 1/38
[52] U.S. Cl. .................................... 358/453; 358/451; 358/909
[58] Field of Search ............... 358/909, 451, 453, 153, 358/906, 448, 76, 31

[56] References Cited

U.S. PATENT DOCUMENTS

| 4,614,977 | 9/1986 | Kawahara et al. | 358/909 |
| 4,910,585 | 3/1990 | Smith et al. | 358/31 |
| 5,138,460 | 8/1992 | Egawa | 358/909 |
| 5,153,737 | 10/1992 | Kobayashi | 358/453 |

FOREIGN PATENT DOCUMENTS 55-165072  12/1980  Japan .................................. 358/453

Primary Examiner—Edward L. Coles, Sr.
Assistant Examiner—Kim Yen Vu
Attorney, Agent, or Firm—Fitzpatrick, Cella, Harper & Scinto

[57] ABSTRACT

An image processing apparatus for processing a provided image signal includes a processor for processing the provided image signal in accordance with a classification between a valid image portion and non-valid image portion of the provided image signal.

25 Claims, 13 Drawing Sheets

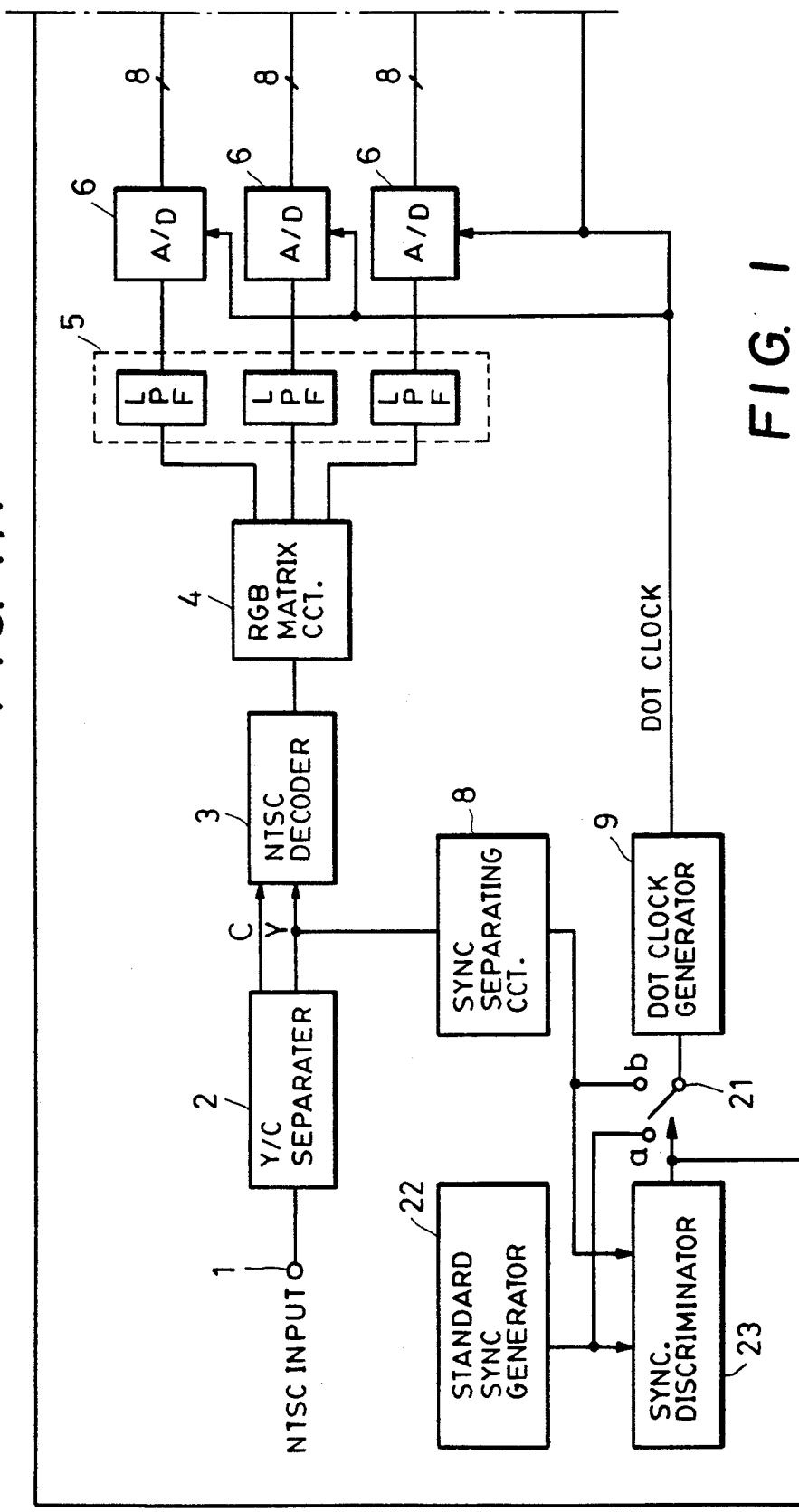

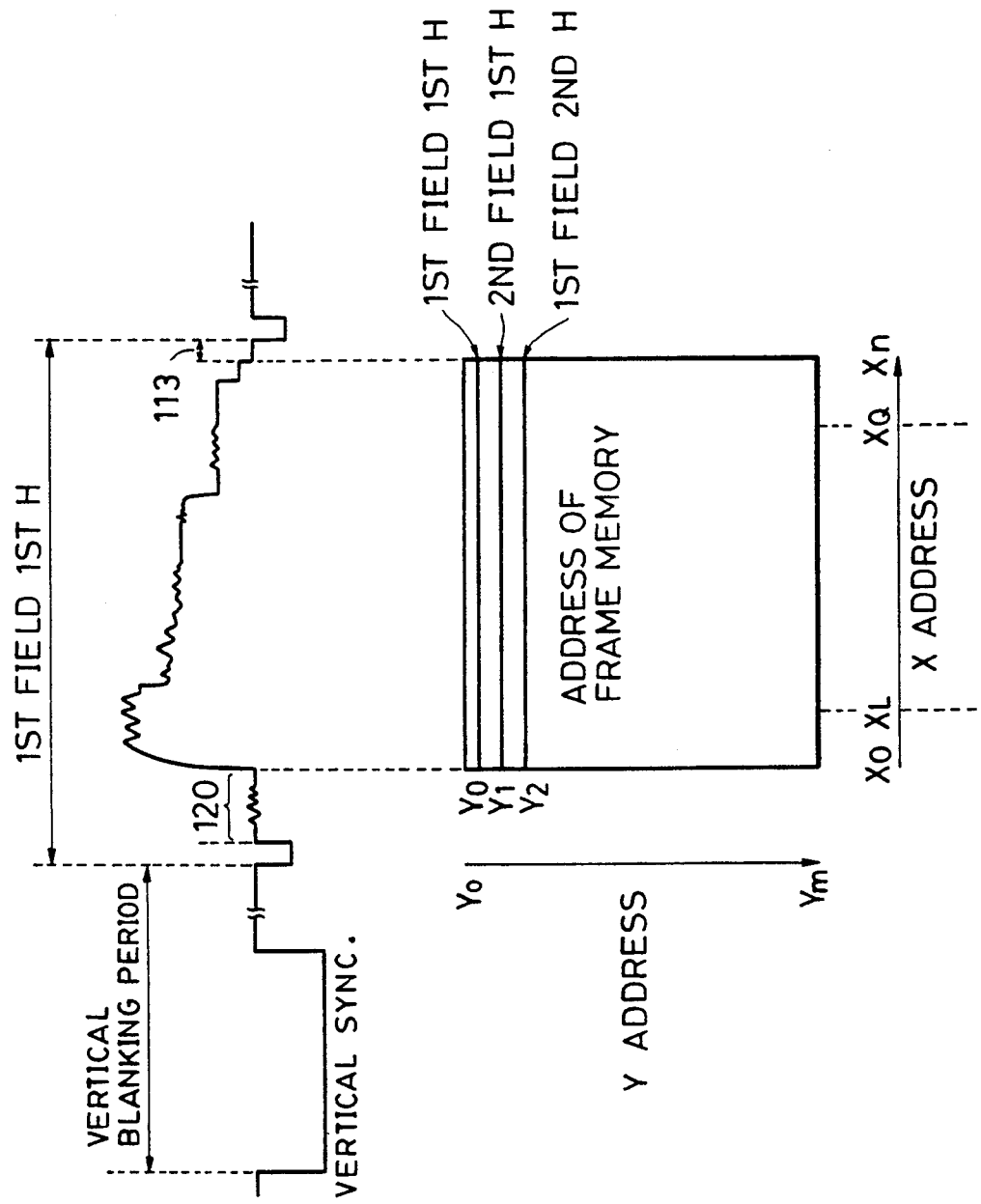

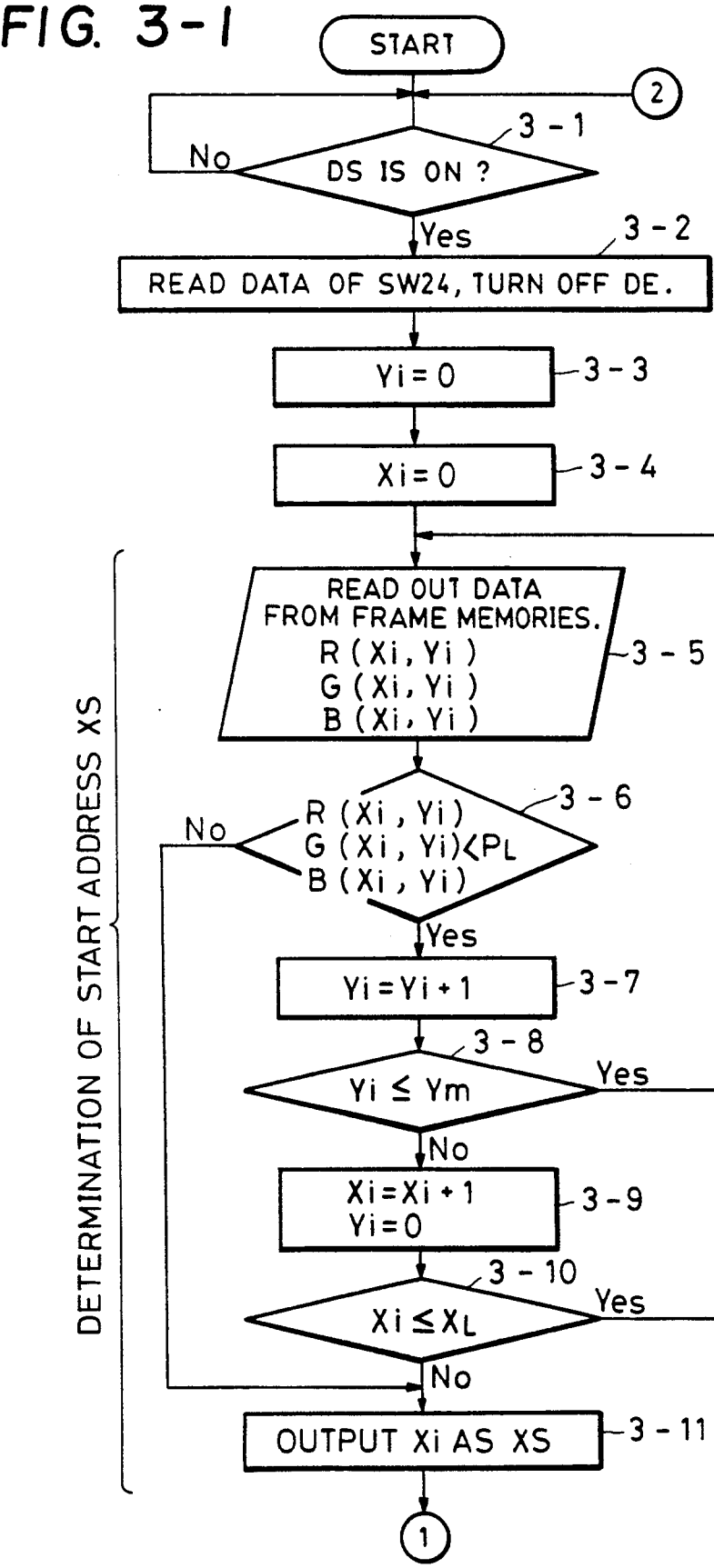

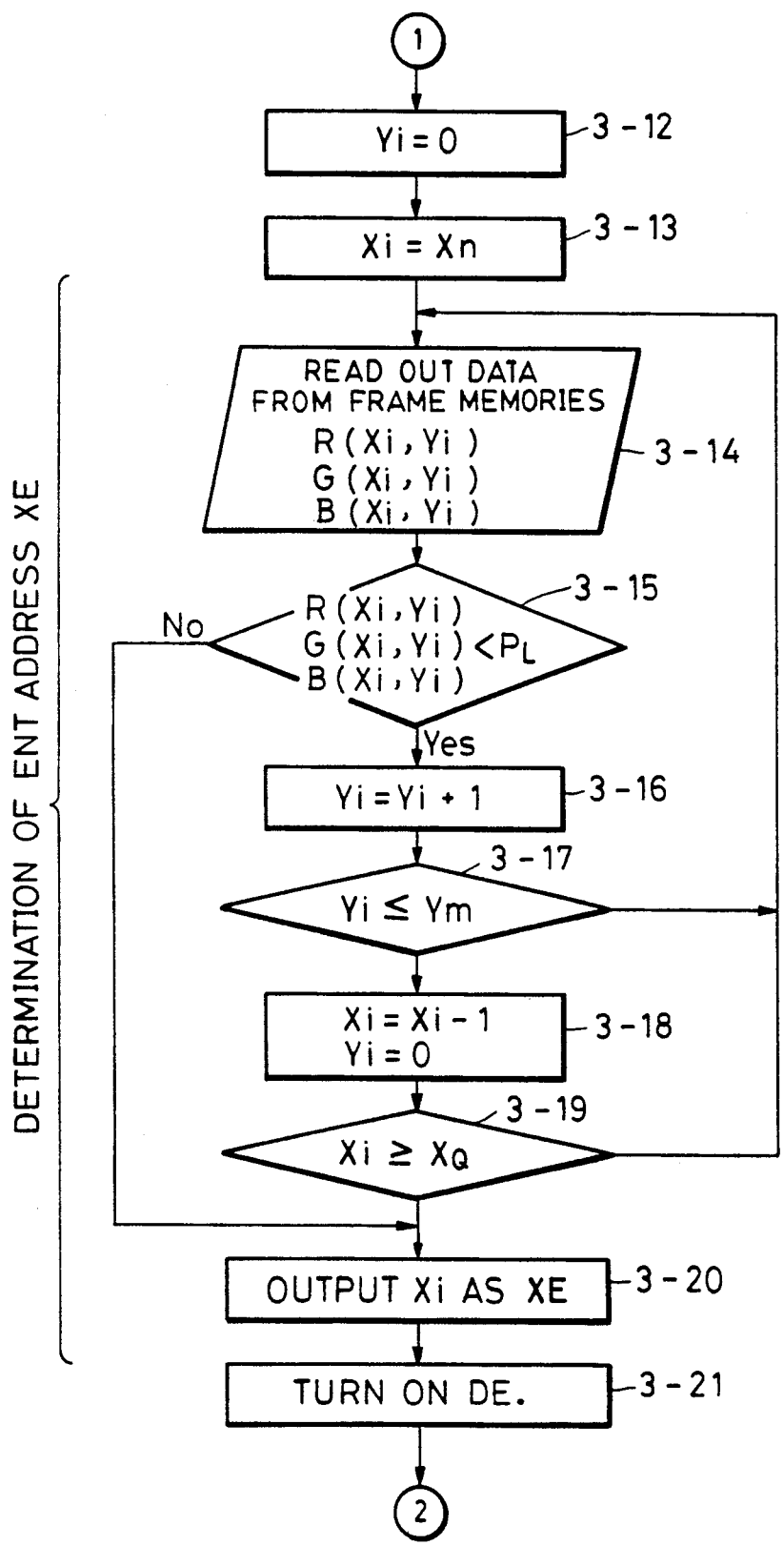

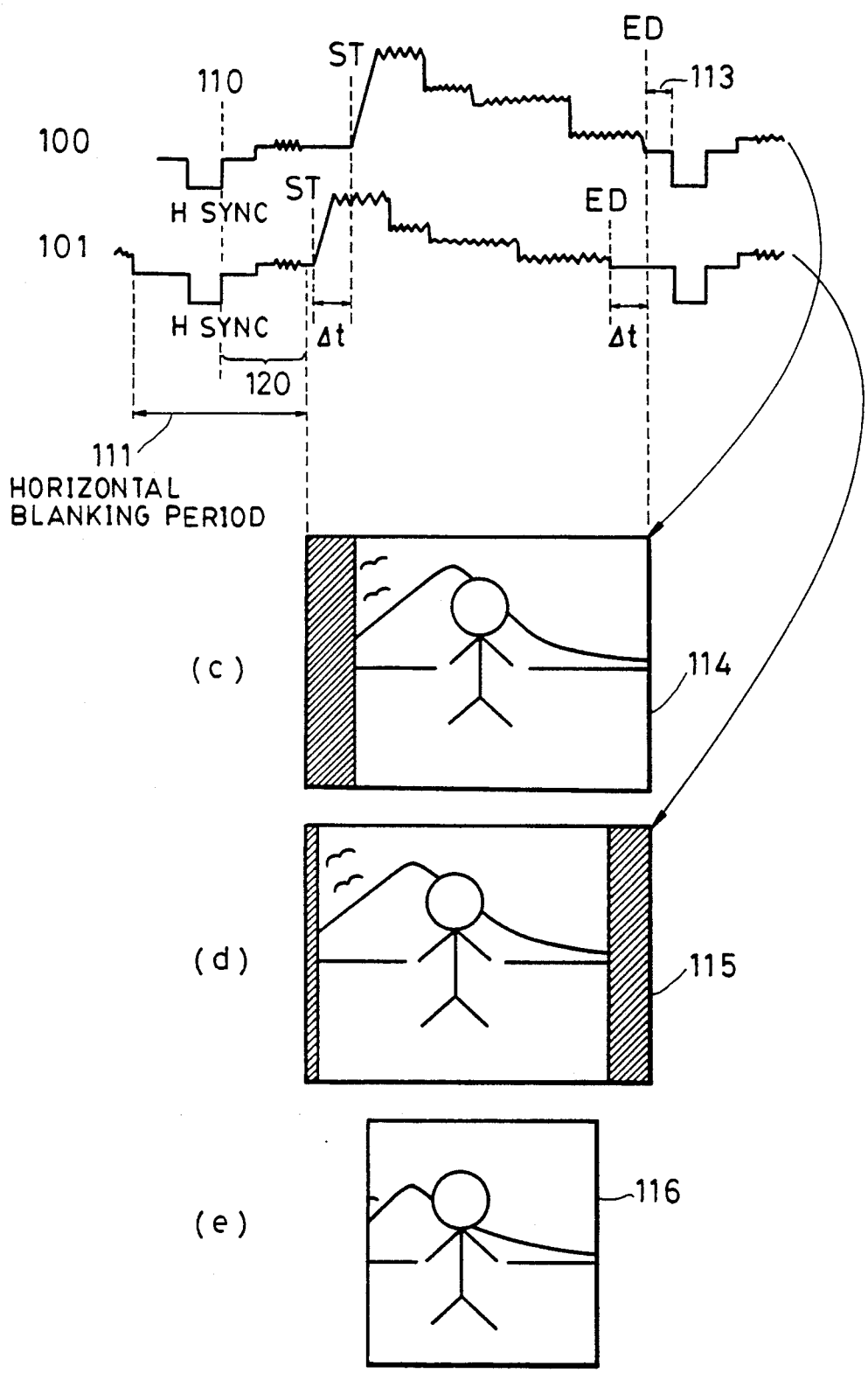

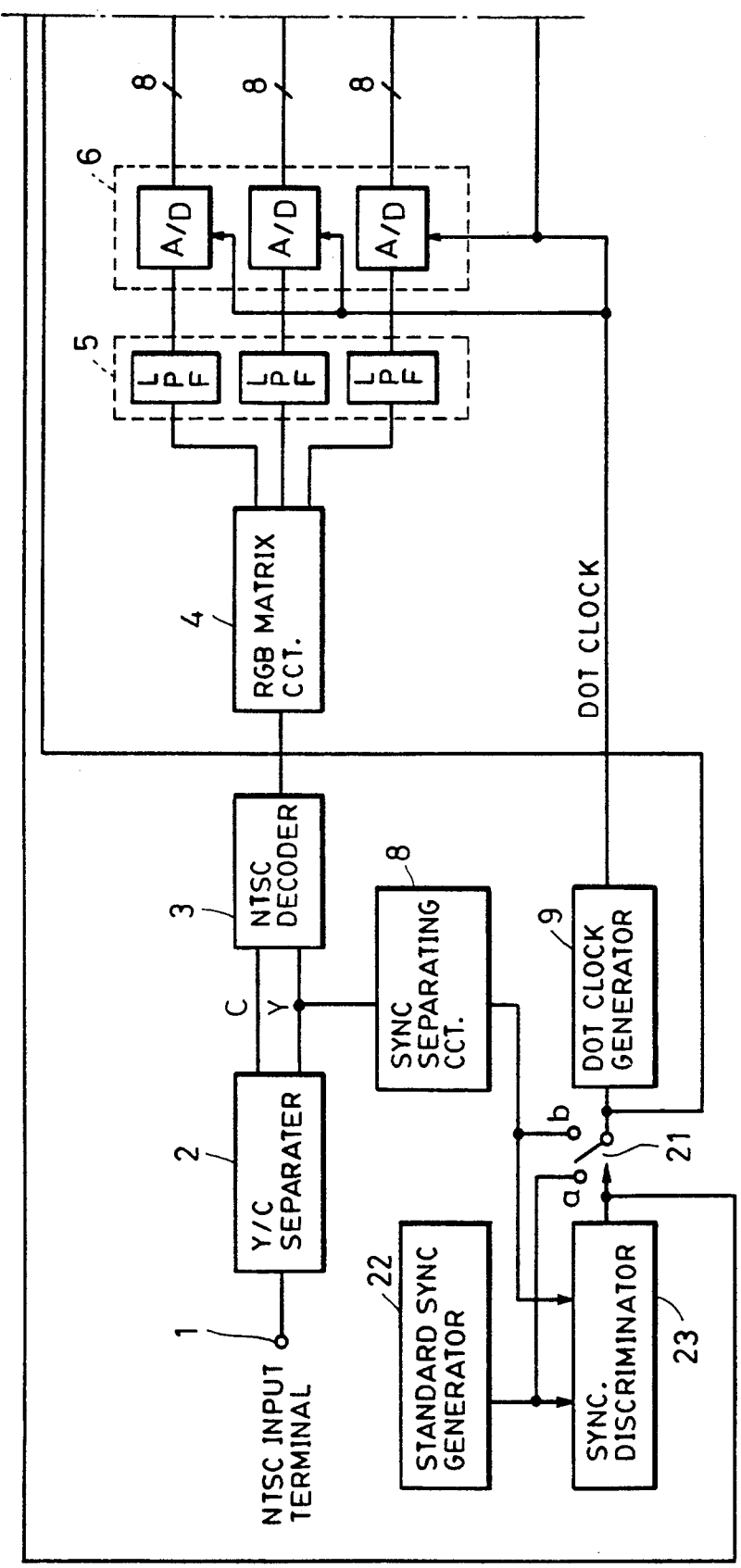

IMAGE SIGNAL PROCESSING APPARATUS FOR DETECTING THE VALID PICTURE PORTIONS OF AN IMAGE SIGNAL

BACKGROUND OF THE INVENTION

1. Field of the Invention

The present invention relates to an image signal processing apparatus for processing an image signal, for example, an image printing apparatus, an image transmitting apparatus or an image storing apparatus.

2. Related Art

Video printers which are able to print a video frame image on a printing paper are well known. These video printers' printing areas are different in accordance with a kind of input device which generates a TV signal as shown in FIG. 4. In other words, valid image signal periods, i.e., from start timing positions ST to end timing positions ED as shown in FIG. 4, are different both in the exact position of the valid image information within the horizontal scan line signal, and, perhaps to a lesser degree, in the fraction of the duration of the horizontal scan line signal made up by the valid image information, in accordance with the kind of the input device.

In FIG. 4, a signal 100 is a video signal from a tri-tube video camera, and a signal 101 is a video signal from a camera for a video recording apparatus. The signals 100 and 101 are different as to location of the valid image period within the period between the successive horizontal synchronizing signals H sync. So, if printing is started immediately after a horizontal blanking period 111 of the signal 101, that is, from a rising 110 of H sync, black will be printed between the end point of the blanking period and the starting point of the valid image period, such as in picture 114. On the other hand, if printing is continued to a starting point of front porch period 113 of the signal 100, a black line will be formed at the right side of a print frame as in picture 115. These black lines spoil the resulting print picture.

In order to prevent formation of the black line, the print starting point and print end point can be shifted by several percent (5 to 10%). However, if this is done, an edge portion of the important valid image will be lost, and will not be reproduced, as shown in print picture 116 in FIG. 4. In other words, in the conventional video printer more than 10% of the actual image information will be lost, and the edge portion of the valid image will not be printed. It is a severe problem that the entire image information cannot be reproduced, for example, in a case of using image information in publishing a newspaper.

In the case that the image signals from the input devices are transmitted as still video signals, the image signals which are generated immediately after the horizontal blanking period 111 of the signal 101 has passed from the rising 110 of the H sync, and until the starting point of the front porch period 113 of the signal 10, are written into a frame memory and all the data stored in the frame memory is transmitted, conventionally.

Thus, some amount of invalid image data and blank image data of the pedestal level is also sent with valid image data, so that the efficiency of transmission is extremely poor.

In order to avoid such waste, the transmission starting point and transmission end point can be shifted by several percent (5 to 10%). If this is done, however, an edge portion of the important valid image will be lost, as in printing, so that this is not a good solution.

Such a problem occurs not only in a video printer and in a transmission apparatus, but also in writing image information into an image memory.

SUMMARY OF THE INVENTION

The purpose of the present invention is to provide an image signal processing apparatus which can use all of the valid image information in a signal without losing valid image information.

Another purpose of the present invention is to provide an image signal processing apparatus which includes a detector for classifying a valid image part and a non-valid image part of the provided image signal, and a processor for processing the provided image signal in accordance with the classification made by the detector.

Another purpose of the present invention is to provide an image transmitting apparatus which can transmit image data efficiently without losing valid image information.

According to one aspect of the invention, therefore, such an image transmitting apparatus includes a detector for making a classification between a valid image part and a non-valid image part, and forwards the classification and the valid image data of the valid image part for any desired processing. Therefore, it is able to transmit image data efficiently without losing valid image data.

The foregoing summary of certain advantageous features of the invention is provided in order that the detailed description of the preferred embodiments thereof that follows may be better understood, and in order that the present contribution to the art may be better appreciated. There are, of course, additional features of the invention the following will be described in that detailed description with reference to the accompanying drawing. Those skilled in the art will appreciate that the conception upon which this disclosure is based may readily be utilized as a basis for designing other structures or methods for carrying out the purposes of the invention. It will be understood what the claims are to be regarded as including such other constructions and methods as do not depart from the spirit and scope of the invention.

BRIEF DESCRIPTION OF THE DRAWINGS

FIG. 2 is a chart illustrating a relationship between an image signal and a frame memory;

FIG. 3-1 and FIG. 3-2 are flowcharts illustrating a method of area discrimination;

FIGS. 4(a)–4(e) are charts illustrating a relationship between input image signals and printing or transmission of image signals;

FIG. 6-1 and FIG. 6-2 are flowcharts illustrating operations of the CPU in FIG. 1;

FIG. 8-1 and FIG. 8-2 are flowcharts illustrating operations of the CPU in FIG. 7.

DETAILED DESCRIPTION OF THE PREFERRED EMBODIMENTS

The preferred embodiments are explained with drawings hereinbelow.

Figures 1, 6:
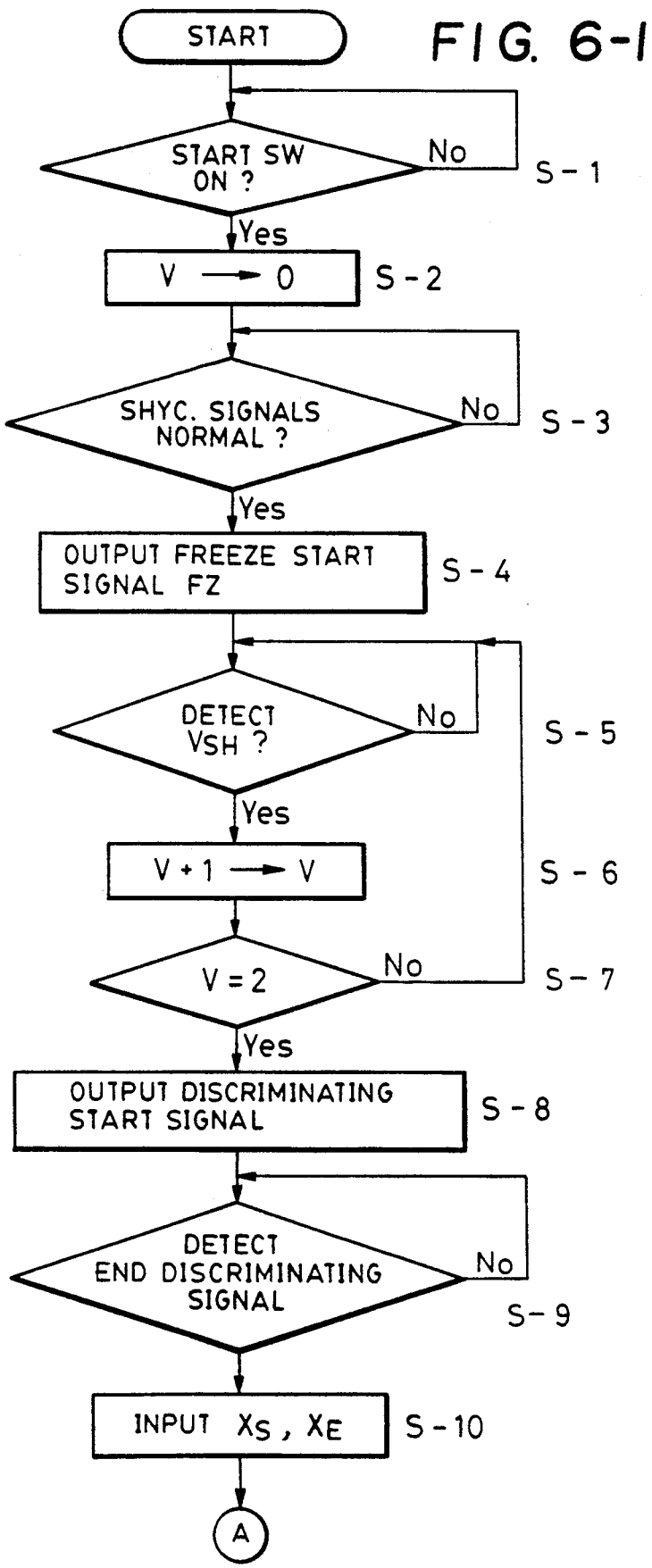

FIG. 1 shows a block diagram of a video printer of a first embodiment. In FIG. 1, the video printer has an NTSC input terminal 1 for inputting an NTSC composite video signal from a tri-tube video camera, a video cassette recorder or a player for a still video disc, a Y/C separator 2 for separating a luminance signal Y and a chrominance signal C from the input NTSC composite video signal, an NTSC decoder 3, an RGB matrix circuit 4 for separating color component signals R, G and B in cooperation with the NTSC decoder 3, three low-pass filters LPF 5 for filtering low frequency components of the respective color component signals, three A/D converters 6 each of which converts an input analog signal to an 8-bit digital signal, three frame memories each of which stores, in digital form, information representing a respective color component, a synchronizing signal separating circuit 8 for separating a composite synchronizing signal CSYNC from the input luminance signal Y, and a dot clock generator 9 for generating a dot clock which determines timing for A/D conversion by the A/D converters 6.

There is also provided a memory interface controller 10 for controlling the frame memories 7, an image area discriminator 11 for discriminating actual image area, a CPU 12 for controlling operations of the video printer totally, a switch interface 13, a manually operated print start switch 14, a line memory 15 for storing image data from the frame memories 7, a transfer controller 16 for controlling a thermal transfer type printer, an ink ribbon or ink paper 17, a transfer paper 18 to have a picture formed thereon, and a thermal head unit 19 which has a plurality of thermal heads for printing images. A roller 20 is also provided for moving the ink paper 17 and the transfer paper 18 along with the thermal head unit.

A standard synchronizing signal generator 22 and a synchronizing signal discriminator 23 are also provided for discriminating whether the separated synchronizing signal is accurate or not. If the discriminator 23 determines that the separated synchronizing signal is accurate, a switch 21 is connected to a terminal b side, but if not, the switch 21 is connected to a terminal a side. A dip-switch 24 is also provided for setting a predetermined level for discriminating the valid image area.

Operation of the video printer is explained as follows, by referring to FIGS. 6-1 and 6-2, which are flowcharts illustrating control operation of the CPU 12.

The printer start switch 14 is depressed, and then a print start signal is supplied to the CPU 12 via the switch interface 13, so that the CPU 12 starts control operation (S-1). The CPU 12 resets a vertical sync counter V to "0" (S-2). When the synchronizing signal discriminator 23 discriminates that the separated synchronizing signal is accurate (S-3), i.e., that the correct composite video signal is being supplied to the NTSC input terminal 1, the output of the discriminator 23 becomes "0", and the output lets the switch 21 connect the side b. At this time, the CPU 12 makes a freeze start signal FZ active (S-4). The freeze start signal is used for permitting the memory interface controller 10 to store the digital image data. Then the interface controller 10 causes the A/D converters 6 to begin digitizing image information for the frame memories 7.

The input analog NTSC composite video signal supplied at the NTSC input terminal 1 is separated into the luminance signal Y and the chrominance signal C by the Y/C separator 2. The separated signals are further separated into three color component signals R (red), G (green) and B (blue) by the decoder 3 and the matrix circuit 4. The bandwidths of these three color component signals R, G and B are restricted by the low-pass filters 5, and the bandwidth-restricted RGB signals are then supplied to the A/D converters 6 respectively.

On the other hand, the composite synchronizing signal CSYN separated by the separator 8 is supplied to the dot clock generator 9, and the dot clock generator 9 generates the dot clock signal in synchronism with the composite synchronizing signal CSYNC. The image signals digitized by the A/D converters 6 with the dot clock signal are sequentially stored into the frame memories 7.

Figures 2, 6:
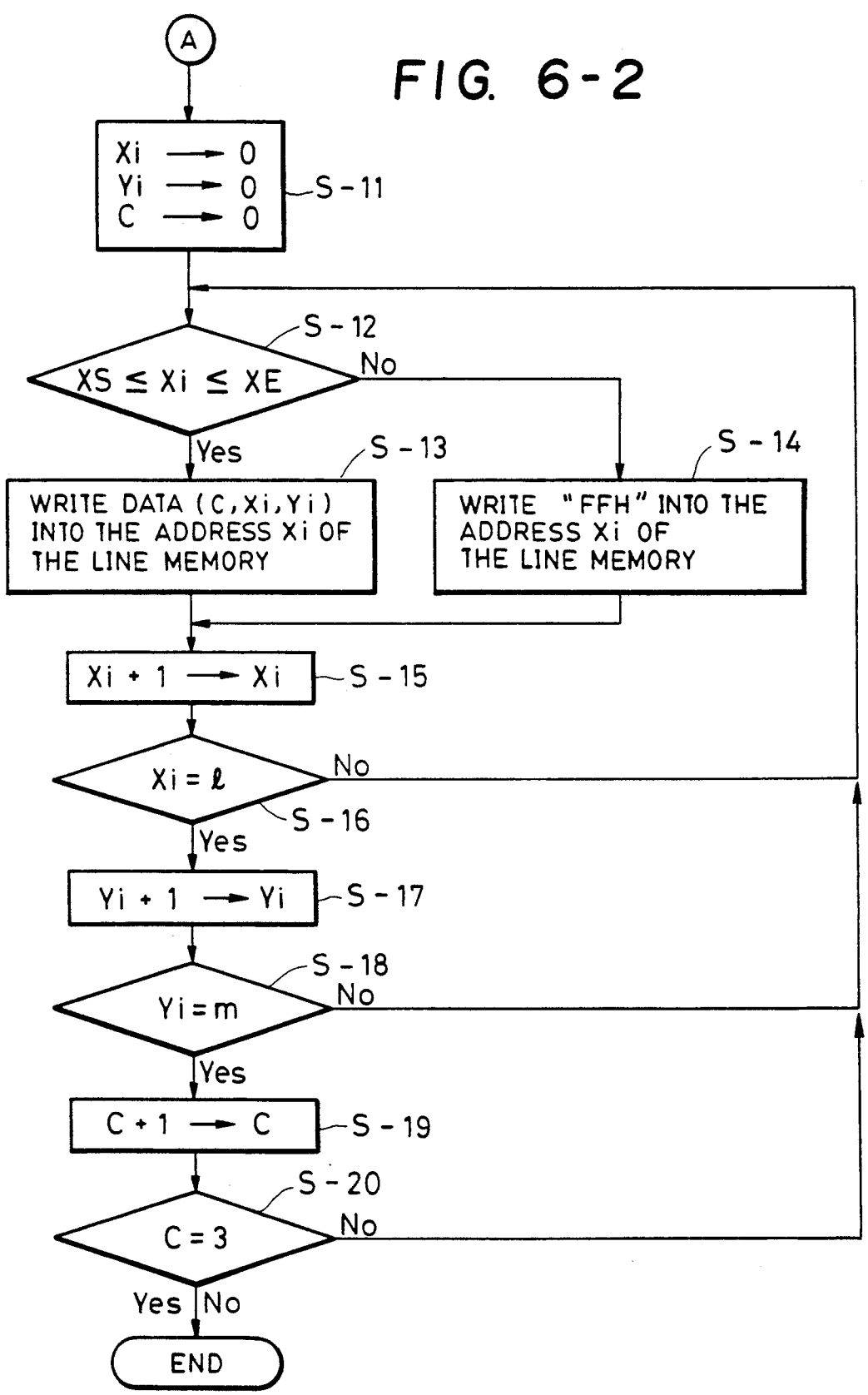

As shown in FIG. 2, the frame memory 7 is structured to store digital image data of two fields (one frame). In an area designated by address Y0 is stored one horizontal period (1H) of digital image data, which is generated during the 21st horizontal period after the vertical synchronizing signal falls, not counting the back porch period 120. The back porch period 120 should be determined by the shortest back porch period among those of the various kinds of video signal generating devices with which the present invention might be used. In other words, the frame memory 7 starts to store the digital image data at the end of the back porch period 120, and the frame memory 7 stops storing them at the start of the front porch period 113. Similarly, the front porch period 113 should be determined by the shortest front porch period among those of the various kinds of video signal generating devices. Thus, the digital image signal of the first field period or vertical period is sequentially stored into the area addressed by Y0, Y2, Y4, - - - . The digital image signal of the second field period is sequentially stored into the area addressed by Y1, Y3, Y5, - - - , and thus the digital image signal for one video frame is stored into the frame memory 7.

The CPU 12 generates the discriminating starting signal DS to the area discriminator 11 after more than two vertical period have elapsed from the freeze starting signal FZ. The passage of two vertical periods is detected by the vertical sync counter V reaching 2" (S-5,6,7). Then the area discriminator 11 starts to read out the digital image data from the frame memories 7, and calculates a start address XS which shows the starting address of valid image area in the frame memory 7 and an end address XE which shows the end address of the valid image area in the frame memory.

After these calculations of XS and XE are finished, the area discriminator 11 informs the CPU 12 of an end discriminating signal DE representing the addresses XS and XE are determined and valid. The CPU12 inputs data XS and XE, after the end discriminating signal DE is determined to be valid (S-9,10).

The CPU 12 converts the image data addressed by X0 through XS-1 to full-white data, for example "FFH" which means level 256, and this converted image data is sent to the line memory 15. The image data addressed by XS through XE is sent to the line memory 15 via the memory interface controller 10 without conversion. And, the image data addressed by XE+1 through the end of the frame memories 7 is sent to the line memory accompanying with the conversion to the full-white data, e.g., "FFH".

When the image data of one horizontal period (1H) is stored in the line memory 15, the transfer controller 16 converts the stored image data in the line memory 15 to density data which is applied to the thermal head unit 19. The temperature of each thermal head is controlled in accordance with the density data, so that the optimum amount of ink is transferred from the ink paper 17 to the transfer paper 18 in accordance with the density data.

After the image data of 1H is transferred, the image data of the next 1H is sent to the line memory and transferred. These operations are repeated for the image data of the last 1H stored in the frame memory. Thus, transfer to the transferring paper of a picture of one frame video data is completed.

There is explained the operation of the CPU12 after the area discrimination as follows, referring to FIG. 6-2.

In step S-11, the CPU 12 initializes X address Xi and Y address Yi of frame memories to "0," and color C representing one of frame memories is initialized to "0", which denotes the red R frame memory. (C=1 means the green G frame memory and C=2 means the blue B frame memory.)

In step S-12, whether the X address Xi is in which the valid area or not is discriminated by using data XS and XE. If Xi is in the valid area, the data of frame memory is transferred to the line memory 15 in step S-13.

On the other hand, if the X address Xi is out of the valid area, full-white data "FFH" is transferred to the line memory 15. These operations are repeated until the line memory 15 is filled with one line of data (S-15,16).

After the transferring of one line of data, the Y address Yi is incremented in step S-17, and the above-described processing is performed for the next one line. Thus, as to Y address Yi, the processes mentioned above are repeated until the Y address Yi reaches m. Thereby, the printing operation of color R is finished, and the color C is changed to green G by incrementing the value of C (S-19). After the printing operation for the color G is terminated, that for color blue B is performed. Thus the printing operations for all colors are terminated (S-20).

Method of Area Discrimination

Referring to FIG. 3, a method of area discrimination performed by the area discriminator 11 is explained as follows. The area discriminator 11 is structured as a microcomputer operated by a software program. The operation of the area discriminator 11 is explained referring to a flowchart of FIG. 3 as follows.

In a step 3-1, the discriminator 11 discriminates whether the discriminator start signal DS is active or not. If the discriminator start signal DS is active, the discriminator 11 advances to step 3-2. If not, the discriminator 11 waits until the discriminator start signal DS becomes active.

In step 3-2, the discriminator 11 reads out the set value of the dip switch 24, and turns off the discriminator end signal DE.

In steps 3-3 and 3-4, addresses Yi and Xi, which designate the address of the frame memory 7, are reset to "0".

In step 3-5, the image data of the frame memories 7 designated by addresses Xi and Yi are read out, and they are expressed as R (Xi, Yi), G(Xi, Yi) and B(Xi, Yi).

In step 3-6, all image data R(Xi, Yi), G(Xi, Yi) and B(Xi, Yi) are respectively compared to the predetermined value PL read out in step 3-2. If all data are smaller than the value PL, processing is advanced to step 3-7. If not, processing is advanced to step 3-11.

In step 3-7, the address of Yi is incremented. In step 3-8, a determination is made as to whether the process of step 3-5 is finished to the lowest line of the frame memories 7 or not. If so, the processing is advanced to step 3-9. If not, the processing is advanced to step 3-5.

Figure 1B:
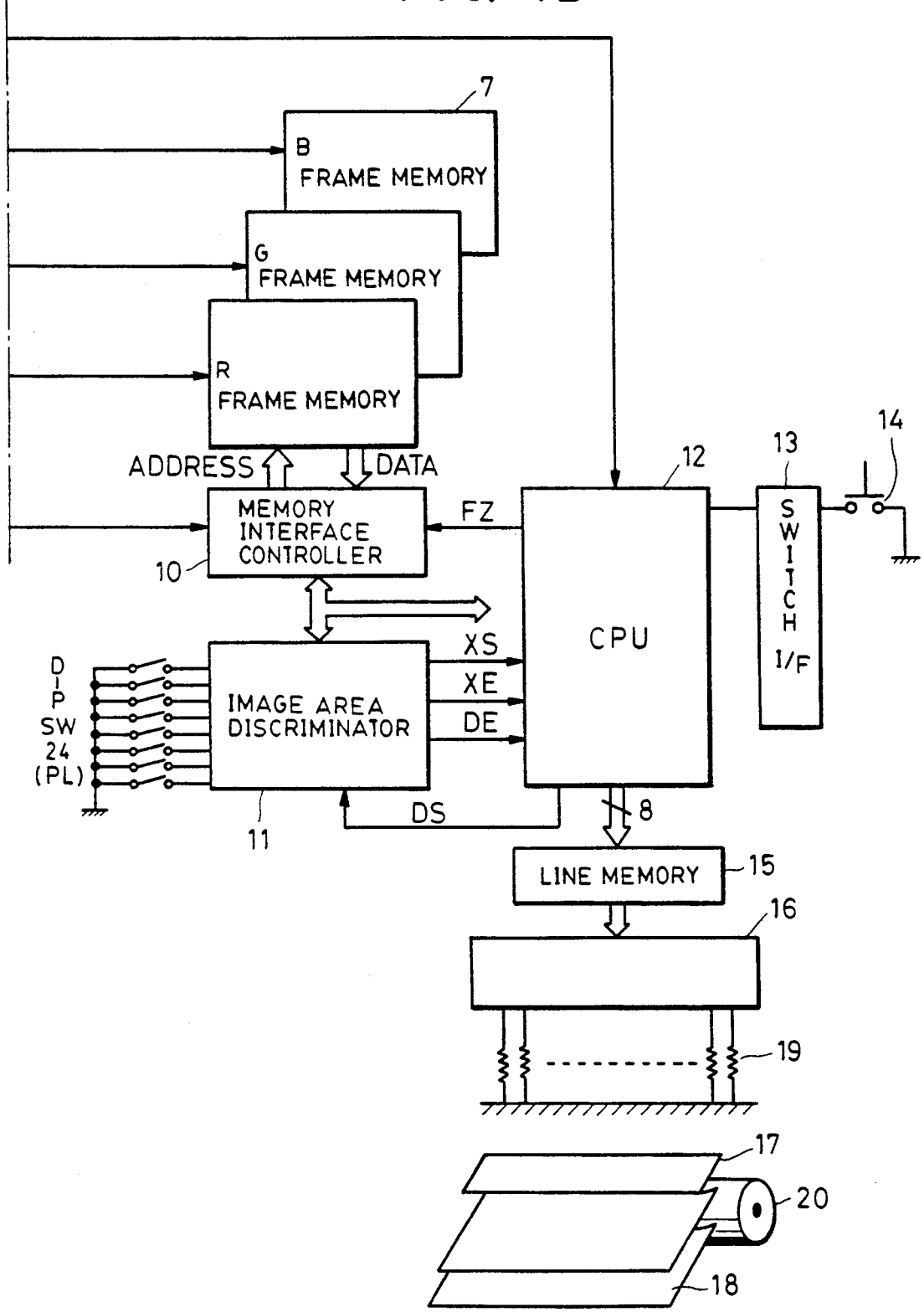
FIG. 1 is a block diagram of a video printer.
Figure 5:
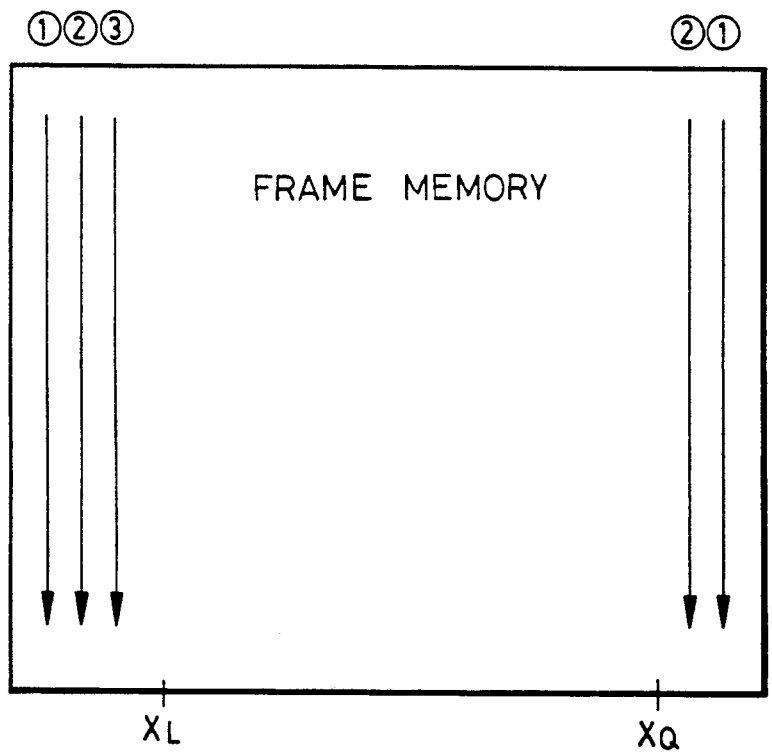
FIG. 5 is a chart for explaining the flowcharts in FIG. 3.

In step 3-9, the address of Xi is incremented, i.e., the discriminator line is shifted to the right, and the address of Yi is reset "0", that is, the discrimination point is shifted to the top point. As shown in FIG. 5, the discrimination point is shifted from top to down and the discrimination line is gradually shifted to the right.

Thus, if one of the image data is bigger than the predetermined level PL, the X address of the image data is output to the CPU 12 as the starting address XS in step 3-11.

But, in step 3-10, whether the X address Xi has been incremented to XL, which is the position 10% short of a full frame, or not, is checked. If not, the process is advanced to step 3-5. But if so, the X address XL is output as the starting address XS. The reason for step 3-10 is as follows. There may be a full black image in various supplied images. Therefore, even if the supplied image is almost black, the size of transferred or printed picture should be larger than the predetermined size set by XL.

FIG. 3A shows how to set the starting address XS, and FIG. 3B shows how to set the end address XE. The address XE is determined similarly to the address XS by steps 3-12 through 3-20. Now the discrimination line is gradually shifted from right to left, and the limit address XE is set to a position 10% from the position for a full frame.

Other operation is almost the same as has already been described, and therefore detailed explanation thereof is omitted. Then, after the end address XE is determined, the discrimination end signal DE is output to the CPU 12.

As mentioned above, the video printer of the first embodiment is structured such that when levels of all color components of the input color composite video signal between a horizontal synchronizing signal and a front edge of the front porch are less than a predetermined level, video data are changed to white data not to be printed by ink. Those white data are sent to a printing part. Then, even if the time intervals between the horizontal signal and the start or end timing of valid video signals having image information are different from standard intervals, the present embodiment prevents generation of a black line at both sides of the printed-picture frame and is able to reproduce all the valid image information contained in the input component video signal.

In the above-described explanation, the area discrimination of the valid area and the invalid area is processed only in the horizontal direction, but the area discrimination can be performed also in the vertical direction. Thus, even if the invalid signal period is scattered in the vertical direction, the scattering can be compensated for.

In the above-described embodiment, an NTSC composite video signal is used as the input signal, but other input signals, e.g., an RGB video signal, a luminance and chrominance signal, a PAL video signal or a SECAM video signal, can be used in the same way.

Further, in the above-described embodiment, the image data in the invalid area is converted to a predetermined signal value, but the image data in the valid area might instead be inserted in the invalid area.

In this embodiment, a thermal transfer type printer is used, but an ink-jet printer or a laser beam printer might be used instead for reproducing input video images. Also, a printer reproducing a full color image is used in this embodiment, but a monochromatic printer can also be used.

Further, the predetermined value PL can be set by means of the dip switch 24, but a value stored in an E²PROM or a ROM, or a solid value, can be used as the value PL. Alternatively, the value PL can be calculated from, e.g., a distribution of all image data stored in the frame memory.

In this embodiment, the CPU 12 for controlling the video printer and the discriminator 11 for discriminating areas are separated, to speed up the calculations performed by the discriminator. But, the CPU 12 can operate both for discrimination of areas and for controlling the video printer. Further, the video printer of this embodiment has an image processor in addition to the printer itself, but a printer including the line memory 15 might be separated from other portions of the printer mechanism.

As described above, this embodiment determines the starting point and the end point of the valid image area by comparing the image data in the frame memory with a set value, and the printer is controlled such that ink is not transferred or deposited, nor an image otherwise formed, in the area outside of the valid image area. In this fashion, the unuseful image data can be omitted from the printed picture, thus maintaining the high quality of the picture.

Another embodiment, in which the present invention is applied to an image signal transmitting apparatus, is explained as follows.

Figure 7B:
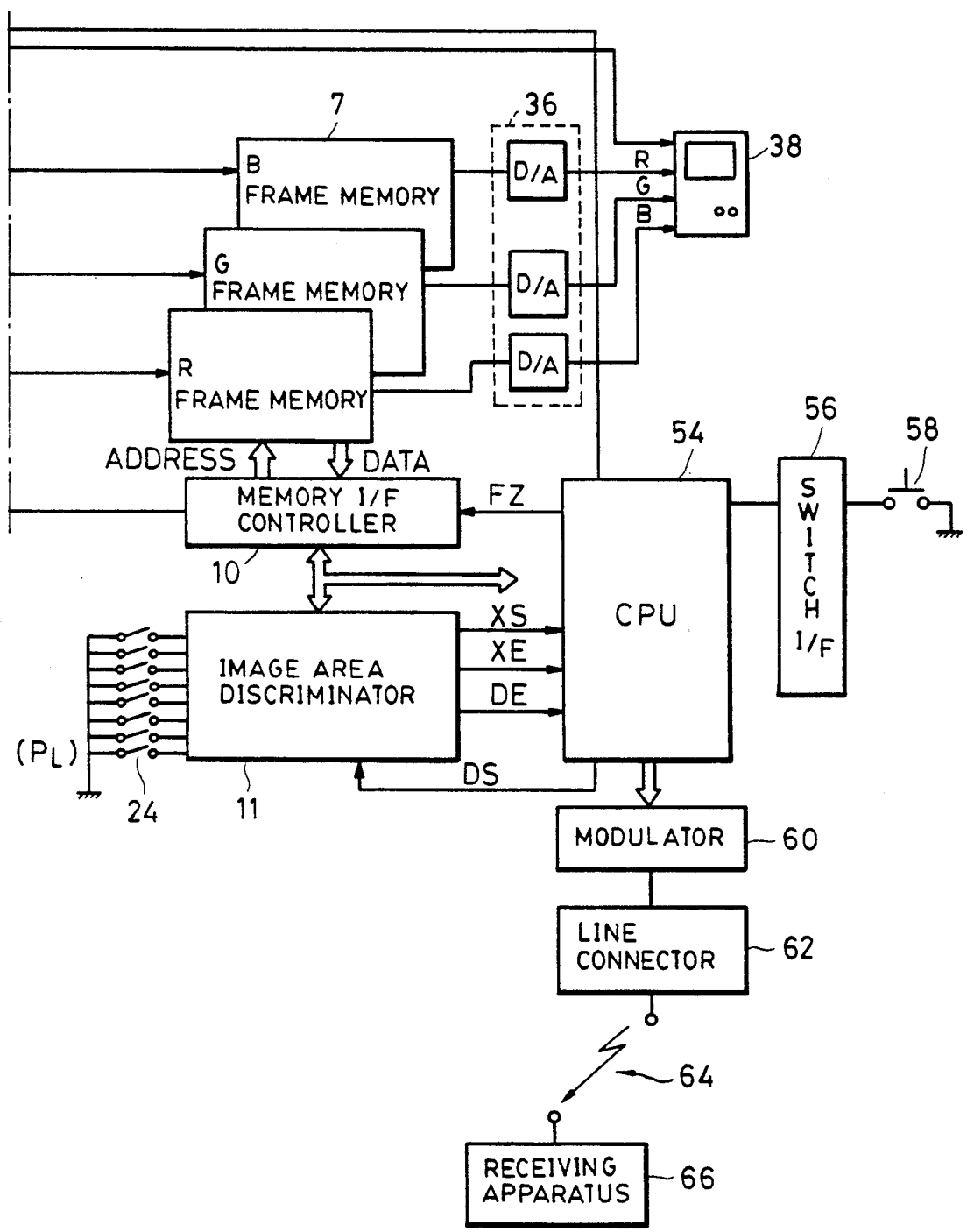
FIG. 7 is a block diagram of an image signal transmitting apparatus.

FIG. 7 shows a block diagram of the image signal transmitting apparatus, and the circuits which have the same numbers as in FIG. 1 perform the same functions, so that explanations of such circuits are omitted.

In FIG. 7, there are provided digital-to-analog D/A converters 6 for converting outputs of the frame memories 7 to analog signals, an image monitoring device 38 such as a TV monitor, a CPU 54 for controlling the transmitting apparatus totally, a switch interface 56, a start switch 58 for manually ordering the start of image transmission, a modulator 60 for modulating image data to be transmitted via a MODEM, and a line connecting circuit 62 for connecting a public telephone line 64 to a receiving apparatus 66.

The operation of the transmitting apparatus is as follows.

On depression of the start switch 58, a start signal is supplied to the CPU 54 via the switch interface 56.

The synchronizing signal discriminator 23 discriminates whether the separated synchronizing signal is accurate, i.e., whether the correct composite video signal is being supplied to the NTSC input terminal. If the composite signal is correct, the discriminator 23 outputs a signal whose level is "0", and lets the switch 21 connect the side b.

At this time the CPU 54 makes a freeze start signal FZ active, the freeze start signal FZ is used for permitting the memory interface controller 10 to store the digital image data, and then the interface controller 10 causes the A/D converters 6 to begin digitizing image information for the frame memories.

The image data is written into the frame memories as follows.

The input analog video signal supplied at the NTSC terminal is separated into the luminance signal T and chrominance signal C by the Y/C separator 2. The separated signals are further separated into three color component signals R (red), G (green), and B (blue) by the NTSC decoder 3 and the matrix circuit 4. The bandwidths of these three color component signals R, G, and B are restricted by the low-pass filters 5, and the bandwidth-restricted RGB signals are supplied to the respective A/D converters 6.

On the other hand, the composite synchronizing signal CSYN separated by the separator 8 is supplied to the dot clock generator 9, and the generator 9 generates the dot clock in synchronism with the signal CSYNC. The A/D converters 6 digitize the three color component signals in synchronism with the dot clock, and the digitized signals are written into the frame memories sequentially.

As shown in FIG. 2, each frame memory 7 is structured to store digital image data of two fields (one frame) sequentially from the 21st horizontal period after the vertical sync falls. Concretely, in the Y address Yo, image data of the first horizontal period (except a vertical blanking period) is stored.

Image data which is to be stored in the frame memories 7 is generated from the end position of the shortest horizontal blanking period to the start position of the shortest front porch period in one horizontal period (1H).

After two vertical periods from the start of storage of image data into the frame memories 7, those memories contain the image data of one frame. Therefore, the CPU 54 generates the discriminating start signal DS to the area discriminator 11 to start the area discriminator after more than two vertical periods have passed from the freeze start signal FZ.

Then the area discriminator 11 starts to read out the digital image data from the frame memories 7, and calculates a start address XS which shows the starting address of valid image area in the frame memories 7 and an end address XE which shows the end address of the valid image area in the frame memories, as in the first embodiment. The area discriminator 11 outputs the discrimination end signal DE, the start address XS and the end address XE to the CPU 54.

The above-mentioned operation of the CPU 54 is almost the same as that of the first embodiment, shown in FIG. 6-1.

Figures 1, 8:
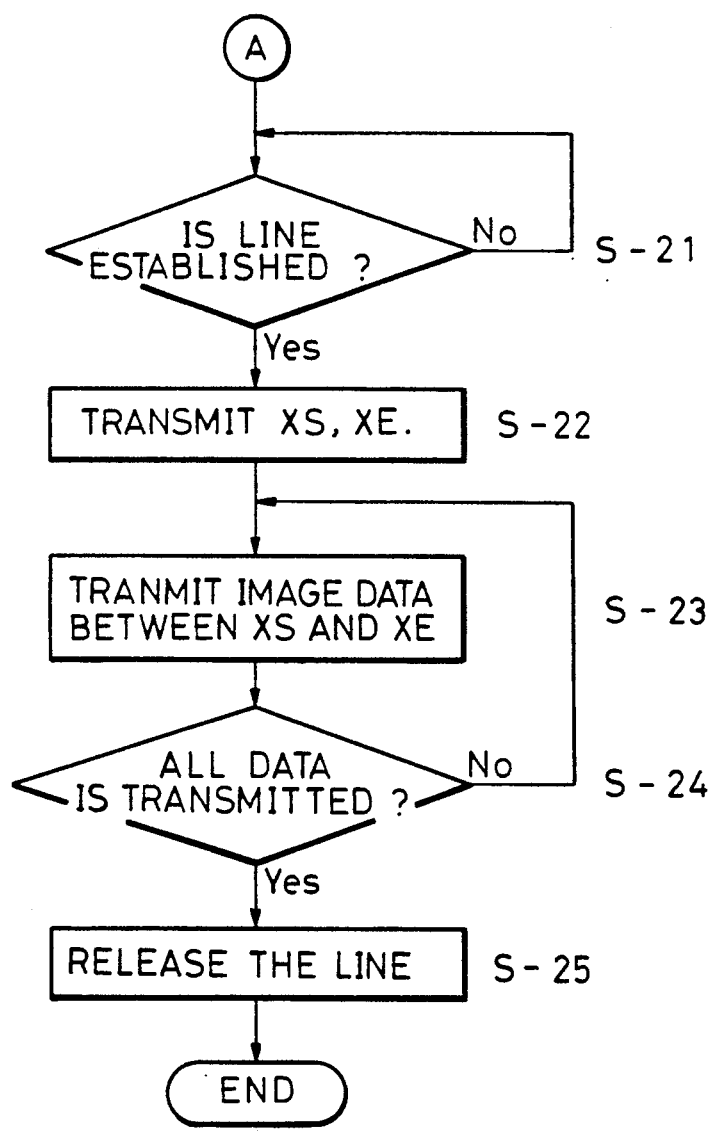
Figures 2, 8:
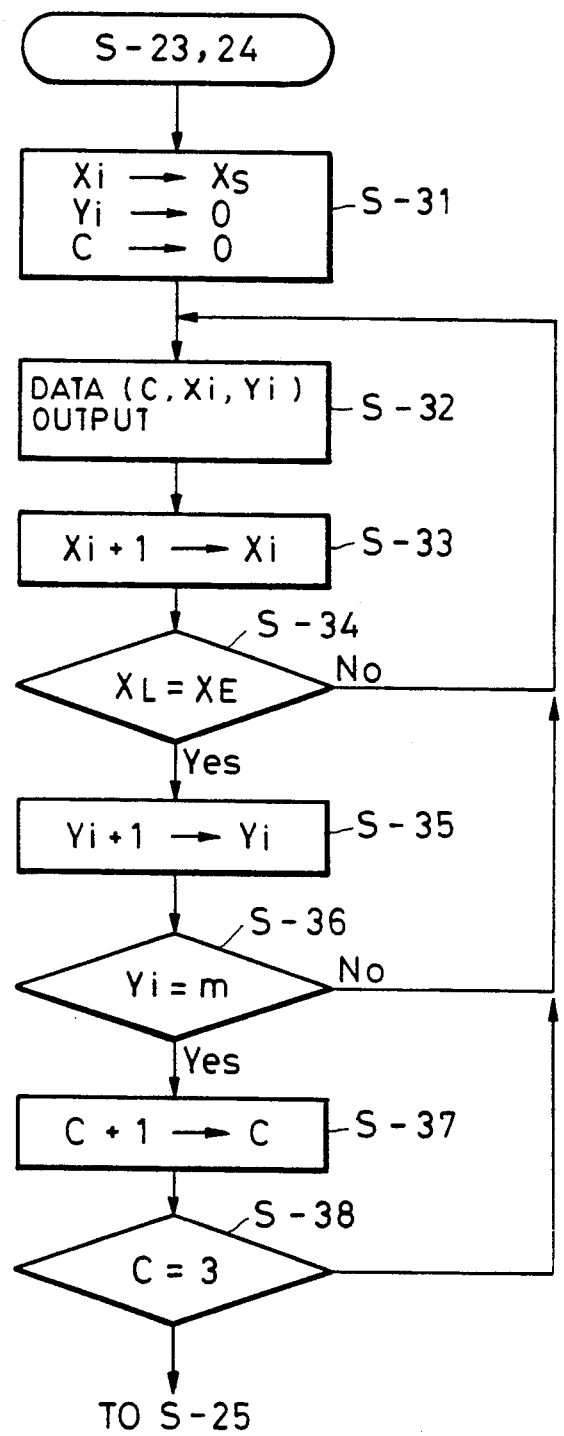

The operation of the CPU 54 after the detection of addresses XS and XE is explained as follows, referring to FIG. 8-1.

After the CPU 54 confirms establishment of a communication line, the CPU 54 transmits the start address XS and the end address XE to the receiving apparatus 66 via the modulator 60, the connecting circuit 62, and the telephone line 64 (S-21).

Then the valid image data between the addresses XS and XE among all the data in the frame memories 7 is transmitted in steps S-23 and S-24. The method of transmission of the valid image data is shown in FIG. 8-2. As shown in FIG. 8-2, the X address Xi is initially set to XS (S-31), and then the data between XS and XE are sequentially transmitted. As to the Y address Yi, the image data from the Y address Yo to m is sequentially transmitted. And as to color, C, the image data for each color R, G, and B is sequentially transmitted as shown in FIG. 8-2.

The receiving apparatus 66 sets the writing area of its frame memory by using the received address data XS and XE initially. Then, the received valid image data between XS and XE is stored in the frame memory according to the writing area.

After all the valid image data is transmitted, the CPU 54 releases the telephone line 62 and terminates its operation (S-25).

As explained above, the area discriminator of the transmitting apparatus of the second embodiment is such that even if the video signal input devices are different or styles of video signals are different in themselves, only the valid image data can be transmitted. And since the receiving apparatus can receive the data showing the addresses of the valid image data at first, the received valid image data can be stored in the memory of the receiving apparatus at the same location as in the memory of the transmitting apparatus. Therefore, the receiving apparatus can reproduce the same style video signal as was input to the transmitting apparatus.

In this embodiment, the NTSC composite video signal is used as the input signal, but other input signals, e.g., a RGB video signal, a separated luminance and chrominance signal, a PAL signal or a SECAM signal, can be used in the same way.

And, not only the color signal but a monochromatic signal can be transmitted.

In this embodiment, the discriminator 11 is separate from the CPU 54, but the function of the discriminator 11 can be preformed by the CPU 54.

The discrimination of the valid data area is performed only in the horizontal direction, but the area discrimination can be processed also in the vertical direction such that scattering in the vertical direction can be compensated for.

In the described embodiments, the valid image portion is discriminated from the signal stored in the frame memory, but the valid image portion might be discriminated before storing of the image signal into the frame memory.

Further, the present invention is applicable not only to television signals but also to other image signals. For example, the present invention can be applied to an image signal which is converted from an original document by means of a scanner.

And, the present invention is not limited only to such a video printer or an image signal transmitting apparatus, but can be applied to a memory apparatus which writes input video data into an image memory, and so on.

As a result of the present invention, effective processing can be performed for both the non-valid area and the valid area. And, valid image data can be reproduced in printing and also in communication.

If the invention is applied to transmitting apparatus, the transmitting efficiency is improved irrespective of periods of non-valid image data.

Although particular embodiments of the present invention are herein disclosed for purposes of explanation, various modifications thereof, after study of this specification, will be apparent to those skilled in the art to which the invention pertains.

What is claimed is:

1. An image signal processing apparatus for processing a provided television signal, comprising:
    means for separating a synchronization signal from said provided television signal;
    detecting means for marking a classification between a valid image portion of the provided television signal and a non-valid image portion of the provided television signal, said detecting means making the classification by discriminating a signal value of the provided television signal except for said synchronization signal; and
    processing means for processing the provided television signal in accordance with the classification made by said detecting means.

2. An image signal processing apparatus according to claim 1, wherein said processing means converts the non-valid image portion of the television signal to a predetermined-level signal.

3. An image signal processing apparatus according to claim 1, further comprising means for printing the valid image portion of the television signal.

4. An image signal processing apparatus according to claim 1, further comprising means for transmitting the valid image portion of the television signal.

5. An image signal processing apparatus according to claim 1, further comprising a memory for storing the provided television signal, wherein said detecting means makes the classification based on the provided television signal stored in said memory.

6. An image signal processing apparatus according to claim 1, wherein said detecting means includes means for securing the valid image portion larger than a predetermined region.

7. An image signal transmitting apparatus for processing a provided image signal, comprising:
    detecting means for detecting position information relating to a position, within the provided image signal, of a valid image portion of the provided image signal; and
    transmitting means for transmitting both (1) the position information of the valid image portion, and (2) the image signal of the valid image portion represented by the position signal, said transmitting means sequentially transmitting the position information and the valid image portion of the image signal.

8. An image signal transmitting apparatus according to claim 7, wherein said transmitting means transmits the position information before transmitting the valid image portion of the image signal.

9. An image signal transmitting apparatus according to claim 7, further comprising a memory for storing the provided image signal, wherein said detecting means detects the valid image portion based on the provided image signal stored in said memory.

10. An image signal transmitting apparatus according to claim 7, wherein said detecting means and said transmitting means are structured to perform their respective detecting and transmitting operations on a television signal as the image signal.

11. An image signal transmitting apparatus according to claim 10, wherein said detecting means includes means for securing the valid image portion larger than a predetermined region.

12. An image signal processing apparatus for processing an image signal, comprising:
    a memory for storing both a valid image portion and a non-valid image portion of the image signal;
    means for separating a synchronization signal from said image signal;

providing means for providing position information relation to the valid image portion, said providing means providing the position information by determining a signal value of the image signal stored in said memory, except for said synchronization signal;

selecting means for selecting the image data in the valid image portion from said memory in accordance with the position information relating to the valid image portion; and processing means for processing the image signal in the valid image portion selected by said selecting means.

13. An image processing apparatus according to claim 12, wherein said processing means transmits the valid image portion of the image signal.

14. An image signal processing apparatus according to claim 13, wherein said processing means transmits the position information of the valid image portion, before transmitting the valid image portion of the image signal.

15. An image signal processing apparatus according to claim 12, wherein said processing means prints the valid image portion of the image signal.

16. An image signal processing method for processing a provided image signal, comprising the steps of:

separating a synchronization signal from said provided image signal;

detecting a signal value of the provided image signal except for said synchronization signal; and discriminating a valid image portion of the provided image signal in accordance with the detected signal value.

17. An image signal processing method according to claim 16, further comprising the step of processing the provided image signal in accordance with the discriminated valid image portion.

18. An image signal processing method according to claim 16, wherein said detected signal value is compared with a predetermined threshold level.

19. An image signal processing method according to claim 16, wherein said processing step comprises the step of converting the image signal of a non-valid image portion into a predetermined level.

20. An image signal processing method according to claim 16, wherein said image signal includes a television signal.

21. An image processing method according to claim 16, wherein said synchronization signal includes a horizontal synchronization signal.

22. An image signal transmitting method for processing a provided image signal, comprising the steps of:

detecting position information relating to a position, within the provided image signal, of a valid image portion of the provided image signal; and transmitting time-sequentially both (1) the position information of the valid image portion, and (2) the image signal of the valid image portion represented by the position signal.

23. An image signal processing method according to claim 22, wherein said transmitting step includes the step of transmitting the position information before transmitting the valid image portion of the image signal.

24. An image signal processing method according to claim 22, wherein said detecting step and said transmitting step are both performed on a television signal as the image signal.

25. An image signal processing method according to claim 24, wherein said detecting step includes the step of securing the valid image portion to be larger than a predetermined region.

* * * * *

UNITED STATES PATENT AND TRADEMARK OFFICE
CERTIFICATE OF CORRECTION

PATENT NO. : 5,231,517  Page 1 of 3
DATED : July 27, 1993
INVENTOR(S) : TOMISHIGE TAGUCHI It is certified that error appears in the above-indentified patent and that said Letters Patent is hereby corrected as shown below:

SHEET 8, FIGURE 6-1

"SHYC." should read --SYNC.--.

SHEET 12, FIGURE 8-1

"TRANMIT" should read --TRANSMIT--.

COLUMN 2

Line 39, "the following" should read --that--.
Line 41, "drawing." should read --drawings.--.
Line 45, "what" should read --that--.

COLUMN 4

Line 44, "period" should read --periods--.

COLUMN 5

Line 24, "which" should be deleted.

UNITED STATES PATENT AND TRADEMARK OFFICE
CERTIFICATE OF CORRECTION

PATENT NO. : 5,231,517

DATED : July 27, 1993

INVENTOR(S) : TOMISHIGE TAGUCHI

It is certified that error appears in the above-indentified patent and that said Letters Patent is hereby corrected as shown below:

COLUMN 6

Line 12, "to" should be deleted.

COLUMN 7

Line 64, "active, the" should read --active. The--.

COLUMN 8

Line 14, "CSYN" should read --CSYNC--.

COLUMN 9

Line 32, "preformed" should read --performed--.

COLUMN 10

Line 3, "marking" should read --making--.

UNITED STATES PATENT AND TRADEMARK OFFICE
CERTIFICATE OF CORRECTION

PATENT NO. : 5,231,517  
DATED : July 27, 1993  
INVENTOR(S) : TOMISHIGE TAGUCHI It is certified that error appears in the above-indentified patent and that said Letters Patent is hereby corrected as shown below:

COLUMN 11

Line 2, "relation" should read --relating--.

COLUMN 12

Line 11, "includes" should read --comprises--.  
Line 13, "processing" should read --signal processing--.

Signed and Sealed this

Thirty-first Day of May, 1994

Attest:

BRUCE LEHMAN

Attesting Officer     Commissioner of Patents and Trademarks